United States Patent
Liao et al.

(10) Patent No.: US 6,552,442 B2
(45) Date of Patent: Apr. 22, 2003

(54) METHOD AND APPARATUS FOR CONTROLLING THE TEMPERATURE OF A VEHICULAR SEAT

(75) Inventors: Shangshyan S. Liao, Ann Arbor, MI (US); Wayne Frank Buescher, Canton, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/682,614

(22) Filed: Sep. 27, 2001

(65) Prior Publication Data

US 2003/0057768 A1 Mar. 27, 2003

(51) Int. Cl.[7] .................................................. B60L 1/00
(52) U.S. Cl. .......................... 307/9.1; 307/10.1; 165/43; 165/203
(58) Field of Search ................................ 307/9.1, 10.1; 165/43, 203

(56) References Cited

U.S. PATENT DOCUMENTS

| 4,966,145 A | * | 10/1990 | Kikumoto et al. | 128/377 |
| 5,626,021 A | * | 5/1997 | Karunasiri et al. | 62/3.5 |
| 5,921,314 A | * | 7/1999 | Schuller et al. | 165/43 |
| 6,059,018 A | * | 5/2000 | Yoshinort et al. | 165/42 |

* cited by examiner

*Primary Examiner*—Brian Sircus
*Assistant Examiner*—Robert L Deberadinis
(74) *Attorney, Agent, or Firm*—Raymond L. Coppiellie

(57) ABSTRACT

An assembly 10 for controlling the temperature of vehicle seats 16, 18. Particularly, the assembly 10 includes a controller 24 which selectively provides electrical power to heating assemblies 40, 42; and 44, 46 and cooling assemblies 48, 50; and 52, 54 in order to heat or cool the seats 16, 18 in a desired manner while concomitantly obviating the need for high current switches within and/or upon the seats 16, 18. The assembly 10 includes a control panel 28 which allows the temperature of the seats 16, 18 to be automatically or manually controlled in a desired manner.

15 Claims, 2 Drawing Sheets

METHOD AND APPARATUS FOR CONTROLLING THE TEMPERATURE OF A VEHICULAR SEAT

BACKGROUND OF INVENTION (1) Field of the Invention

The present invention generally relates to a method and an apparatus for controlling the temperature of a vehicular seat and more particularly, to a centralized temperature controller which is remotely deployed from the vehicle seat and which may be used to remotely control the temperature of the seat by selectively sourcing or causing electrical power to be provided to the temperature control assemblies which are deployed upon and/or within the vehicle seat.

(2) Background of the Invention

Typically, the temperature of a vehicular seat is controlled by the use of at least one selectively energizable heater or heating assembly and at least one selectively energizable cooling assembly. Particularly, each of these assemblies are deployed upon and/or within the seat and are each respectively coupled to a relatively high current switch (e.g., a switch which is adapted to operatively receive in excess of about twenty amperes of electrical current). More particularly, each of the switches are deployed upon the seat and are coupled to a source of electrical current (e.g., the vehicular battery) and to a controller which receives instructions from a user of the vehicle that a certain amount of hot or cold energy is to be generated and communicated to the seat. The controller, upon receipt of the instruction, generates and communicates a signal to at least one of the switches, effective to cause electrical current to flow through the at least one selected switch and energize the temperature control assembly which is coupled to that switch.

While the foregoing configuration does allow the temperature of the vehicular seat to be selectively controlled, it suffers from some drawbacks. For example and without limitation, the placement of the switches upon the bottom surface of the seat undesirably increases the likelihood of damage to the switches caused by materials which are typically placed under the seat, and further increases the difficulty in removing and/or servicing the switches (i.e., the entire seat typically must be removed in order to allow the switches to be removed or serviced). Moreover, placement of the switches upon an exposed surface of the seat, in order to reduce the cost and complexity of removing and servicing the switches, is aesthetically undesirable and further increases the likelihood of damage to the switches. Further, the use of separate switches (e.g., one for each temperature control assembly) further undesirably increases overall production and maintenance costs, and the placement of the switches within the vehicular seat, to reduce the likelihood of damage, further undesirably increases the cost and complexity of servicing and/or removing the switches. Moreover, these high current type switches are relatively expensive.

SUMMARY OF INVENTION

It is a first non-limiting advantage of the present invention to provide a method and an apparatus for controlling the temperature of a vehicular seat which overcomes some or all of the previously delineated drawbacks of prior strategies.

It is a second non-limiting advantage of the present invention to provide a method and an apparatus for controlling the temperature of a vehicular seat which overcomes some or all of the previously delineated drawbacks of prior strategies and which, by way of example and without limitation, obviates the need for relatively high current switches which are operatively deployed upon and/or within the vehicular seat.

According to a first non-limiting aspect of the present invention, an assembly is provided. Particularly, the assembly includes a selectively energizable seat heater; a selectively energizable seat cooling apparatus; and a controller which selectively provides electrical power to the heater and to the cooling apparatus, effective to selectively energize the heater and the cooling apparatus, thereby controlling the temperature of a seat.

According to a second non-limiting aspect of the present invention, a vehicle is provided. Particularly, the vehicle includes at least one seat; an instrument panel; a climate control assembly having a first portion which is deployed within the instrument panel and which is coupled to a source of electrical power; and a selectively activatable second portion which is deployed within the at least one seat and which is coupled to the first portion, effective to allow electrical power to be communicated from the first portion to the second portion and to allow the temperature of the at least one seat to be controlled by the selective activation of the second portion in response to a receipt of electrical power from the first portion.

According to a third non-limiting aspect of present invention, a method is provided for controlling the temperature of a vehicular seat. Particularly, the method includes the steps of placing a heater upon the seat; placing a cooling assembly within the seat; providing a controller; remotely locating the controller from the seat; coupling the controller to the heater and to the cooling assembly; and coupling the controller to a source of electrical power, thereby allowing the heater and the cooling assembly to be selectively energized through the controller, effective to control the temperature of the seat.

These and other features, aspects, and advantages of the present invention will become apparent from a reading of the following detailed description of the preferred embodiment of the invention and by reference to the following drawings.

DETAILED DESCRIPTION

Figure 1:
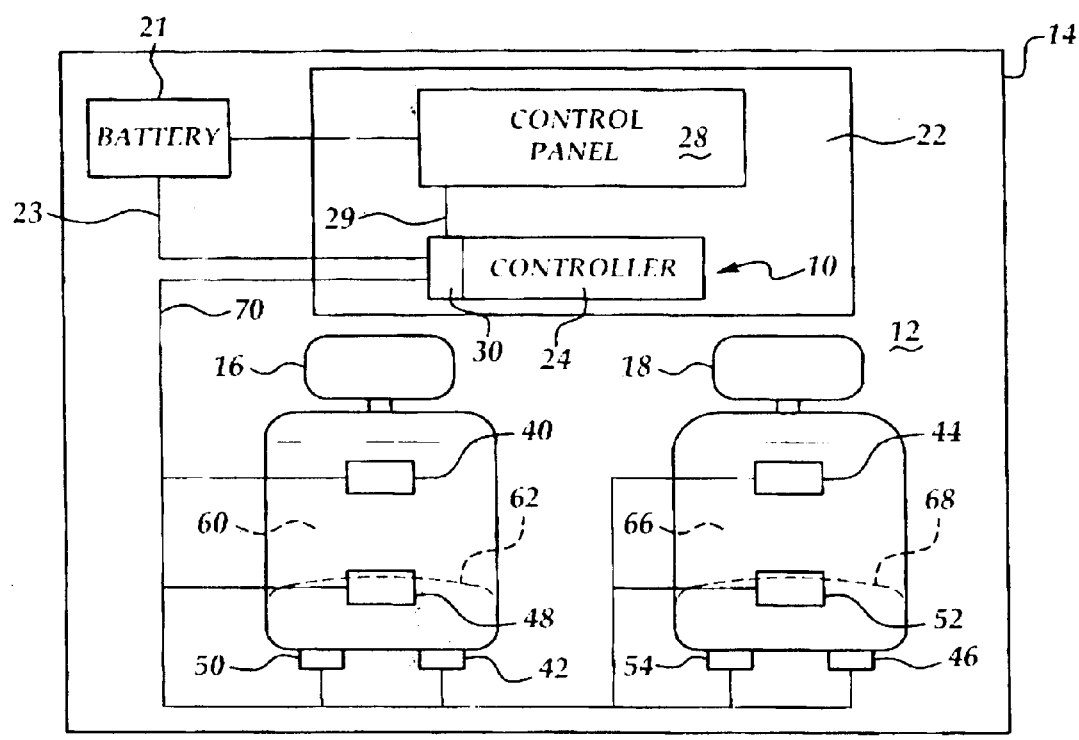
FIG. 1 is a block diagram of a vehicular seat temperature control apparatus which made in accordance with the teachings of the preferred embodiment of the invention and which is deployed within a conventional vehicular passenger compartment.

Referring now to FIG. 1, there is shown a vehicular seat temperature control apparatus 10 which is made in accordance with the teachings of the preferred embodiment of the invention and which is deployed within the passenger compartment 12 of a vehicle 14.

Particularly, the vehicle 14 includes a pair of seats 16, 18, a source of electrical energy (e.g., a conventional vehicular battery) 21, and an instrument panel 22. It should be appreciated that the present invention is applicable to a wide variety of diverse vehicular configurations and that nothing in this description should limit the present invention to a particular type of vehicle.

Temperature control apparatus 10 includes a controller 24 which is operable under stored program control and which is operatively deployed within, or "behind", the instrument panel 22. Apparatus 10 also includes a control panel 28 which is disposed within the instrument panel 22. Controller 24 includes an input/output or I/O portion 30, which is coupled to the battery 21 by the bus 23 and to the control panel portion 28 by the bus 29. Further, the temperature control apparatus 10 includes heating assemblies 40, 42, 44, and 46 and cooling assemblies 48, 50, 52, and 54. As shown, heating assemblies 40 and 42 are respectively deployed upon or within the back portion 60 and the support portion 62 of the seat 16 while the cooling assemblies 48, 50 are similarly and respectively deployed upon the back portion 60 and the support portion 62 of the seat 16. Similarly, the heating assemblies 44, 46 are respectively deployed upon or within the back portion 66 and the support portion 68 of the seat 18 while the cooling assemblies 52, 54 are operatively and respectively deployed upon or within the back portion 66 and the support portion 68 of the seat 18. Each of the assemblies 40, 42, 44, 46, 48, 50, 52, and 54 are coupled to the I/O portion 30 by bus 70. It should be appreciated that while substantially all of the following discussion only describes the temperature control of vehicular seat 16, it is equally applicable to the temperature control of vehicular seat 18 and to any other vehicular seat (not shown) to which apparatus 10 is similarly and operatively coupled. Moreover, it should be appreciated that the present invention is not limited to the number, type, or arrangement of assemblies 40, 42, 44, 46, 48, 50, 52, and 54, which are shown in FIG. 1.

In operation, when it is desired to control the temperature of the vehicular seat 16, a signal is generated from the control panel 28, through bus 29, through the I/O portion 30, and then to the controller 24 indicating the nature of the temperature adjustment(e.g., whether it is desired to heat or cool the vehicular seat 16 and the relative amount by which seat 16 is to be heated or cooled). The controller 24 then selectively activates the assemblies 40, 42, 48, and 50 by sourcing power directly to assemblies 40, 42, 48, and 50, to effectuate the desired temperature. The control panel 28 is more fully described below.

Upon receipt of the signal from the control panel 28, the controller 30 causes electrical power, received from the battery 21 through bus 23, to be sourced or directly provided, through bus 70, to one or more of the assemblies 40, 42, 48, and 50 in order to effectuate the desired temperature adjustment. The foregoing operation obviates the need or the requirement for relatively high current switching assemblies as the electrical power is directly provided or sourced to these temperature control assemblies 40, 42, 48, and 50 (and to assemblies 44, 46, 52, and 54) from the battery or energy source 21 through the controller 24 (e.g., through I/O portion 30). It should be appreciated that, in other non-limiting embodiments, controller 24 may comprise one or more operatively linked controllers (e.g., one controller may receive the signals emanating from portion 28 and order a second controller to cause electrical power to be communicated to one or more assemblies 40–54 through the input/output or other communications portion of this second controller. The configuration and use of the control panel 28 is explained in greater detail below.

Figure 2:
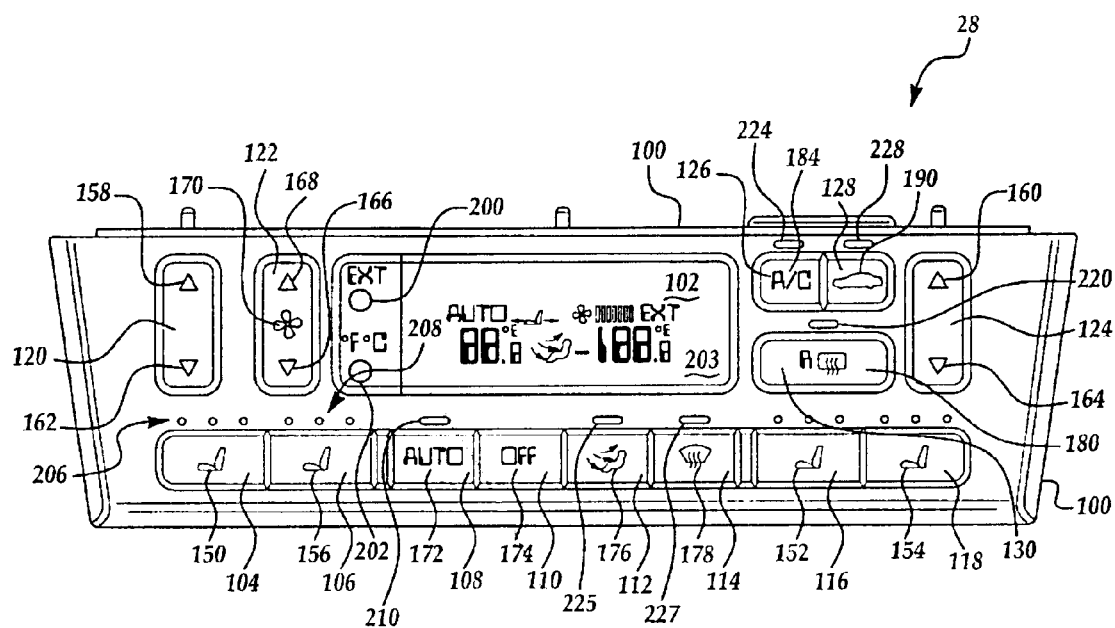
FIG. 2 is a front view of the control panel which is shown in FIG. 1.

As shown best in FIG. 2, control panel 28 comprises a substantially rectangular housing 100 which is disposed within or which is integrally formed with the instrument panel 22. Particularly, the control panel 28 includes a display portion 102 and several selectively depressible switches or touch sensitive or capacitive type portions or membranes 104–130 which are electronically coupled to the controller 24 and which cause certain desired events or operations to selectively occur in the manner which is more fully set forth below. That is, each switch or touch sensitive membrane 104–130 respectively provides a signal to the controller 24 which causes the controller 24 to perform some action according to the software or logic resident within the controller 24.

Switches 104, 116 each include, in the most preferred embodiment of the invention, a substantially similar and respective blue seat ensignia 150, 152 while switches 106, 118 each include, in the most preferred embodiment of the invention, a substantially similar and respective red seat ensignia 156, 154. Switches 120 and 124 each respectively include an upwardly extending red arrow 158, 160 and a downwardly extending blue arrow 162, 164. Switch 122 includes an upwardly extending black arrow 168, a downwardly extending black arrow 166, and a conventional fan symbol 170. Switch 108 has a printed black Auto ensignia 172, switch 122 has a black ensignia 176 which depicts several arrows and a seated individual, and switch 114 has a black ensignia 178 which is a conventional front window defrost symbol. Switch 110 has a black ensignia 174 which comprises the word "off". Switch 130 has a black ensignia 180 which signifies a rear window defrosting operation, switch 126 has an ensignia 184 which is designated AC and which signifies the activation of an air conditioning operation, and switch 128 has a black ensignia 190 in the form of vehicle 14. Display portion 102 includes a first portion 200 which is illuminated when the ambient temperature of the environment that the vehicle 14 is deployed within is acquired by controller 24 and appears upon the display portion 203, and a second portion 202 which signifies whether the temperature is being displayed in units of Fahrenheit or Centigrade (e.g., when the portion 202 is illuminated, the temperature is displayed in units of Fahrenheit, although other illumination embodiments may be utilized).

In operation, a selective depression of switches 104, 116 respectively causes the cooling assemblies 48, 50; and 52, 54 to be activated and to respectively cool the seats 16, 18. Moreover, a selective depression of switches 106, 118 respectively causes the heating assemblies 40, 42; and 44, 46 to be activated and to respectively heat the seats 16, 18. The operation of switches 104, 106 will be discussed in greater detail below and it should be apparent that the operation of switch 118 is substantially similar to that of switch 106 and that the operation of switch 116 is substantially similar to that of switch 104 with the exception that switches 116 and 118 respectively heat and cool the seat 18 while switches 104, 106 respectively heat and cool the seat 16.

A first depression of the switch 104 causes the controller 24 to have the cooling assemblies 48, 50 provide a first amount of cooling energy to the seat 16. A second depression of the switch 104 causes the controller 24 to have the cooling assemblies 48, 50 provide a second and greater amount of cooling energy to the seat 16, while a third depression of the switch 104 causes the controller 24 to have the cooling assemblies 48, 50 provide a third and even greater amount of cooling energy to the seat 16. In one non-limiting alternate embodiment, a first depression of the switch 104 causes the controller 24 to have the cooling assemblies 48, 50 provide a first and greatest available amount of cooling energy to the seat 16; a second depression of the switch 104 causes the controller 24 to have the cooling assemblies 48, 50 provide a second and lesser amount of cooling energy to the seat 16; and a third depression of the switch 104 causes the controller 24 to have the cooling assemblies 48, 50 provide a third and even lower or minimally provided amount of cooling energy to the seat 16 (i.e., the selective and sequential depressions of the switch 104 cause a highest, middle, and then lowest amount of cooling energy to be applied to seat 16). In one non-limiting embodiment, the amount of cooling energy provided by the assemblies 48, 50 is dependent upon the amount of power which is applied to the assemblies 48, 50 and/or to the duration or length of time that this power is applied or communicated to the assemblies 48, 50 from the controller 24.

As shown best in FIG. 2, a luminescent portion 206, resides above the switch 104, and provides three discrete luminescent portions. Each depression of the switch 104 causes a unique one of the luminescent portions to illuminate, thereby providing the user of the vehicle with a positive acknowledgment of the amount of cooling energy being provided to the seat 16 by the cooling assemblies 48, 50. That is, the number of illuminated portions corresponds to the amount or level of cooling energy which is being provided to seat 16 (e.g., when the maximum amount of cooling energy is provided, all of the illumination portions are activated and when the minimum allowable amount of cooling energy is provided, only a single portion is illuminated). A fourth depression of the switch 104 deactivates the cooling assemblies 48, 50 and causes all of the illumination, emanating from the portion 206, to be eliminated. The above-delineated cooling cycle may be repeated by subsequent depressions of the switch 104.

A first depression of the switch 106 causes the controller 24 to have the heating assemblies 40, 42 provide a first amount of heating energy to the seat 16. A second depression of the switch 106 causes the controller 24 to have the heating assemblies 40, 42 provide a second and greater amount of heating energy to the seat 16, while a third depression of the switch 106 causes the controller 24 to have the heating assemblies 40, 42, provide a third and even greater amount of heating energy to the seat 16. In an alternate embodiment, a first depression of switch 106 causes a maximum allowable amount of heat to be provided to seat 16; a second depression of switch 106 causes a lower amount of such heat to be provided to seat 16; and a third depression of switch 106 causes the lowest amount of such heat to be provided to seat 16. As shown best in FIG. 2, the luminescent portion 208, above the switch 106, provides three discrete luminescent portions. Each depression of the switch 106 causes a unique one of the luminescent portions to illuminate, thereby providing the user of the vehicle with a positive acknowledgment of the amount of heating type energy being provided to the seat 16 by the heating assemblies 40, 42, in the same manner as did the previously discussed portion 206. A fourth depression of the switch 106 deactivates the heating assemblies 40, 42 and causes all of the illumination, emanating from the portion 208, to be eliminated. The above-delineated heating cycle may be repeated by subsequent depressions of the switch 106. Further, as previously explained with regards to assemblies 48, 50, the amount of heating type energy which is provided by the assemblies 40, 42 may be regulated by adjusting the amount of electrical power received by the assemblies and/or the duration or length of time that the assemblies 40, 42 receive such power. It should also be appreciated that assembly 40 may be independently activatable from assembly 42 and that assembly 48 may be independently activatable from assembly 50.

Switches 120 and 124 respectively allow a user to program a certain desired temperature within the controller 24, and, more particularly, the controller 24, when in an automatic mode of operation, causes the temperature of the passenger compartment 12 to be selectively fixed at that particular pre-determined and/or pre-set temperature. Particularly, the controller 24, in an automatic mode, may utilize the assemblies 40–54 as well as an air conditioner (not shown), or other available and conventional climate control type assemblies to achieve the desired target temperature. Particularly, the depression of the lower portion of each respective switch 120, 124 (e.g., the respective portion upon which the ensignia 162, 164 is respectively overlaid) causes the programmed temperature to decrease by an amount proportion to the number of respective depressions of the switches 120, 124, while the depression of the upper portion of each respective switch 120, 124 (e.g., the respective portion upon which the ensignia 158, 160 is respectively overlaid) causes the programmed temperature to increase by an amount proportional to the number of respective depressions of the switches 120, 124.

The depression of the switch 108, which includes the word AUTO" 172, causes the controller 24 to cause the air conditioner and/or other selected climate-control elements to selectively causes the temperature of the passenger compartment 12 be subsequently equal to the pre-determined and pre-programmed temperature. Further, as shown, control panel 28 includes an illumination portion 210 which resides above the switch 108 and which illuminates when the automatic mode of operation is occurring or is activated.

Concurrently depressing both of the switches 104, 106 will cause the controller 24 to activate the assemblies 40, 42, 48, and 50 in a certain "automatic" manner, effective to cause the seat 16 to have a certain pre-selected temperature which may be stored within the controller 24. Once the temperature has been achieved, in the seat 16, the controller 24 deactivates the assemblies 40, 42, 48, and 50 until the controller 24 senses (by use of temperature sensors (not shown)) that the temperature of the seat 16 differs from the respectively programmed temperature by a certain respective amount (e.g., about five degrees Fahrenheit). A subsequent depression of either switch 104 or 106 will deactivate the "automatic seat temperature" mode of operation.

A selective depression of the switch 110 disables the heater (not shown) and air conditioner (not shown). A second depression of the switch 110 allows the heater and air conditioner to function. A selective depression of the switch 112 causes the controller 24 to open one or more vents (not shown) which is effective to allow a user to control the air distribution within the passenger compartment 12 of vehicle 10. A second depression of the switch 112 disables this operation. An illumination member 225, resides above switch 112 and becomes illuminated when the switch 112 is first depressed to allow air distribution to occur.

A selective depression of switch 114 causes the controller 24 to activate a front window defrost assembly (not shown), effective to defrost the front window of the vehicle 12 (i.e., the window in front of the seats 16, 18). A second depression of the switch 114 disables this front window defrost operation. An illumination member 227 resides above the switch 114 and becomes illuminated when the switch 114 is first depressed to allow defrosting to occur. A selective depression of switch 130 causes the controller 24 to activate a rear window defrost assembly (not shown), effective to defrost the rear window of the vehicle 12 (i.e., the window opposite of the front window). As shown, control panel 28 includes an illumination portion 220 which is disposed above the switch 130 and which illuminates when the rear window defrost operation is occurring. The rear window and the front window defrosting operations may terminate after the passage of a pre-determined period of time.

A selective depression of the switch 128 causes the controller 24 to selectively recirculate air within the passenger compartment 12. A second depression of the switch 112 disables this feature. Control panel 28 further includes an illumination portion 228 which becomes illuminated when this switch 128 is energized or is operational.

A selective depression of the switch 126 causes the controller 28 to activate an air conditioning assembly (not shown), effective to cool the interior of the vehicle 12. A second depression of the switch 126 disables this air conditioning operation. Control panel 28 further includes an illumination portion 224 which resides above the switch 126 and which becomes illuminated when the air conditioning operation is occurring. Moreover, when the air conditioning operation occurs, a depression of the top portion of the switch 122 (e.g., the portion overlaid by the ensignia 168) increases the amount of air which is provided in direct proportion to the amount by which the portion is depressed and a depression of the bottom portion of the switch 122 (e.g., the portion overlaid by the ensignia 166) decreases the amount of air which is provided in direct proportion to the amount by which the portion is depressed. The display portion 102 is further used, by controller 24, to display the function or operation which is currently being achieved in addition to the programmed temperatures and the ambient or external temperature.

It is to be understood that the invention is not limited to the exact construction or method which has been illustrated and discussed above, but that various changes and modifications may be made without departing from the spirit and the scope of the inventions as are more fully delineated in the following claims.

What is claimed is:

1. An assembly comprising;
   a source of electrical power;
   a selectively energizable seat heater;
   a selectively energizable seat cooling apparatus;
   a controller having a communications portion which is coupled to said source of electrical power and to said heater and cooling apparatus, wherein said controller selectively provides electrical power to said heater and to said cooling apparatus, effective to selectively energize said heater and said cooling apparatus, thereby controlling the temperature of a seat; and
   a control panel which is coupled to said communications portion and which includes a first portion which selectively causes electrical power to be provided to said heater through said communications portion, wherein said first portion selectively causes a first preset amount of heating energy to be provided to said seat, a second and greater preset amount of heating energy to be provided to said seat, and a third and even greater preset amount of heating energy to be provided to said seat.

2. The assembly of claim 1 wherein said control panel further includes a second portion which selectively causes electrical power to be provided to said cooling apparatus through said communications portion.

3. The assembly of claim 2 wherein said first and second portions each comprise a selectively depressible switch.

4. assembly of claim 2 wherein said first and second portions each comprise a touch sensitive membrane.

5. The assembly of claim 2, wherein said second portion causes a first and second amount of cooling energy to be provided to said seat.

6. The assembly of claim 4, wherein said controller contains a certain temperature. value and wherein said controller causes said seat to be heated until the temperature of said seat is substantially equal to said temperature value.

7. A vehicle comprising at least one seat; an instrument panel; a climate control assembly having a first portion which is deployed within said instrument panel and which is coupled to a source of electrical power; and a selectively activatable second portion which is deployed within said at least one seat and which is coupled to said first portion, effective to allow electrical power to be communicated from said first portion to said second portion and to allow the temperature of said at least one seat to be controlled by the selective activation of said second portion in response to a receipt of electrical power from said first portion, wherein said first portion selectively causes a first preset amount of heating energy to be provided to said seat, a second and greater preset amount of heating energy to be provided to said seat, and a third and even greater preset amount of heating energy to be provided to said seat.

8. The vehicle of claim 7, wherein said first portion comprises a controller; and a control panel which is coupled to said controller.

9. The vehicle of claim 8, wherein said second portion comprises a heater.

10. The vehicle of claim 8, wherein said second portion comprises a cooling apparatus.

11. The vehicle of claim 8, wherein said control panel further includes at least one depressible member which selectively causes said controller to provide electrical power to said second portion, said depressible member further causing said controller to provide a first amount of electrical power to said second portion in response to a first depression of said depressible member, causing said controller to provide a second and greater amount of electrical power to said second portion in response to a second depression of said depressible member, and causing said controller to provide a third and even greater amount of electrical power to said second portion in response to a third depression of said depressible member.

12. The vehicle of claim 8, wherein said controller further contains a certain temperature value and wherein said controller regulates said temperature of said at least one seat, effective to cause the temperature of said at least one seat to equal said certain temperature value.

13. The vehicle of claim 7, wherein said source of electrical power comprises a vehicular battery.

14. A method for controlling the temperature of a vehicular seat, said method comprising the steps of:
   placing a heater upon said seat;
   placing a cooling assembly within said seat;
   providing a controller;
   remotely locating said controller from said seat;
   coupling said controller to said heater and to said cooling assembly;
   coupling said controller to a source of electrical power, thereby allowing said heater and said cooling assembly to be selectively energized through said controller: and
   providing a control panel having at least one first selectively depressible member which selectively causes a first preset amount of heating energy to be provided to said seat upon a first depression of said selectively depressible member, a second and greater preset amount of heating energy to be provided to said seat upon a second depression of said selectively depressible member, and a third and even greater preset amount of heating energy to be provided to said seat upon a third depression of said selectively depressible member.

15. The method of claim 14 further comprising the steps of:
   placing at least one second member upon said control panel;
   coupling said control panel to said controller; and
   causing said temperature of said seat to be controlled by use of said at least one second member.

* * * * *